(12) United States Patent
Thaemlitz

(10) Patent No.: US 6,908,887 B2
(45) Date of Patent: Jun. 21, 2005

(54) SUSPENDING AGENT

(75) Inventor: Carl J. Thaemlitz, Katy, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 317 days.

(21) Appl. No.: 10/225,766

(22) Filed: Aug. 22, 2002

(65) Prior Publication Data

US 2004/0038829 A1 Feb. 26, 2004

(51) Int. Cl.$^7$ ................................................ C09K 7/06
(52) U.S. Cl. .................... 507/131; 507/241; 507/244
(58) Field of Search ................... 507/131, 241, 507/244

(56) References Cited

U.S. PATENT DOCUMENTS

| | | | | |
|---|---|---|---|---|
| 3,397,816 A | | 8/1968 | Ess et al. | 220/81 |
| 3,668,129 A | | 6/1972 | Willett | 252/8.5 P |
| 4,108,779 A | | 8/1978 | Carney | 252/8.5 P |
| 4,343,743 A | | 8/1982 | Coquard et al. | 260/404.5 |
| 4,436,862 A | * | 3/1984 | Tetenbaum et al. | 524/445 |
| 4,569,985 A | | 2/1986 | Frihart et al. | 528/291 |
| 4,816,551 A | * | 3/1989 | Oehler et al. | 528/295.3 |
| 5,021,170 A | | 6/1991 | Shumate et al. | 252/8.515 |
| 5,330,662 A | | 7/1994 | Jahnke et al. | 252/8.551 |
| 5,536,871 A | | 7/1996 | Santhanam | 560/196 |
| 5,556,832 A | | 9/1996 | Van Slyke | 507/203 |
| H1611 H | | 11/1996 | Patel | 507/103 |
| 5,620,946 A | * | 4/1997 | Jahnke et al. | 507/131 |
| 5,641,890 A | | 6/1997 | Wesley et al. | 44/266 |
| 5,710,110 A | | 1/1998 | Cooperman et al. | 507/131 |
| 5,723,550 A | | 3/1998 | Jones et al. | 525/344 |
| 5,735,943 A | | 4/1998 | Cody et al. | 106/164.3 |
| 5,773,706 A | | 6/1998 | Wesley et al. | 44/266 |
| 5,834,533 A | | 11/1998 | Patel et al. | 523/130 |
| 5,851,961 A | | 12/1998 | Magyar | 507/119 |
| 5,906,966 A | | 5/1999 | Thaler et al. | 507/122 |
| 5,942,468 A | | 8/1999 | Dobson, Jr. et al. | 507/136 |
| 5,958,844 A | * | 9/1999 | Sinquin et al. | 507/90 |
| 6,169,134 B1 | | 1/2001 | Jones et al. | 524/476 |
| 6,187,719 B1 | | 2/2001 | Dino et al. | 507/129 |
| 6,204,224 B1 | | 3/2001 | Quintero et al. | 507/123 |
| 6,221,920 B1 | * | 4/2001 | Hillion et al. | 516/15 |
| 6,339,048 B1 | * | 1/2002 | Santhanam et al. | 507/131 |
| 6,492,430 B1 | * | 12/2002 | Hillion et al. | 516/15 |
| 6,750,180 B1 | * | 6/2004 | Argillier et al. | 507/131 |
| 2002/0098997 A1 | * | 7/2002 | Audibert-Hayet et al. | 510/417 |
| 2004/0102332 A1 | * | 5/2004 | Thompson et al. | 507/100 |
| 2004/0110642 A1 | * | 6/2004 | Thompson et al. | 507/100 |

FOREIGN PATENT DOCUMENTS

| | | | |
|---|---|---|---|
| WO | WO 0/78891 | 12/2000 | C09K/7/06 |
| WO | WO 01/19333 A1 | 3/2001 | A61K/7/48 |

* cited by examiner

*Primary Examiner*—Philip C. Tucker
(74) *Attorney, Agent, or Firm*—Craig W. Roddy; Haynes and Boone LLP

(57) ABSTRACT

A method and composition is provided for a suspending agent for supporting components in drilling fluids, particularly oil-based drilling fluids, the suspending agent comprising the condensation product of a dimer or trimer fatty acid and diethanolamine.

23 Claims, No Drawings

SUSPENDING AGENT

BACKGROUND

The present embodiment relates generally to a suspending agent for drilling fluids.

While drilling oil and gas wells, a drilling fluid, which may be oil-based or water-based as explained below, is circulated through a drill bit in a well bore and then back to the earth surface, thereby lubricating the drill string and removing cuttings from the well bore. In general, the viscosity of the drilling fluid should be relatively low, while the yield point must be high enough to carry the cuttings out of the hole.

Down hole, the drilling fluid is subjected to relatively high temperatures and relatively high shear rates, which keeps the drilling fluid components in solution. However, drilling fluids are non-Newtonian fluids, in that the viscosity is not constant at all shear rates. Thus, a "freshly built" drilling fluid typically does not have a yield point at a low shear rate sufficient to suspend all of the drilling fluid components, particularly weighting agents. Settling of the components out of solution is a concern for several reasons. For example, after settling, the resulting drilling fluid may not conform to the desired characteristics for a specific drilling application. Likewise, settling can increase transportation costs, due to increased costs for cleaning transport vessels.

Thus, a suspending agent is needed for supporting components in drilling fluids, for example, freshly built drilling fluids. As the drilling fluid will experience higher shear rates once down hole, a suspending agent will not be required permanently. Moreover, a permanently effective suspending agent may cause excessive pump pressure by increasing the viscosity beyond optimal conditions. Therefore, it would be beneficial if the effect of the suspending agent were temporary.

DESCRIPTION

A suspending agent for supporting components in oil-based drilling fluids, according to the present embodiment comprises the condensation product of a dimer or trimer fatty acid and diethanolamine.

The term "oil-based drilling fluid" is used to refer to drilling fluids which have an oil-based continuous phase, rather than a water-based continuous phase. Oil-based drilling fluids commonly comprise hydrocarbons, rheology modifying components, surfactants and emulsifiers, weighting agents, and, in the case of invert emulsion drilling fluids, water. It is understood that the disclosure of this specification contemplates use of the temporary suspending agent with invert emulsion sweeping fluids, acidizing fluids, frac fluids, and spacer fluids, as well as the above-mentioned drilling fluid.

In one embodiment, the fatty acid is oleic acid, and oleic acid dimers or trimers are used in the suspending agent.

In a preferred embodiment, the fatty acid is a dimer fatty acid. A dimer fatty acid consists of acyclic, monocyclic, bicyclic, aromatic isomers, as shown below:

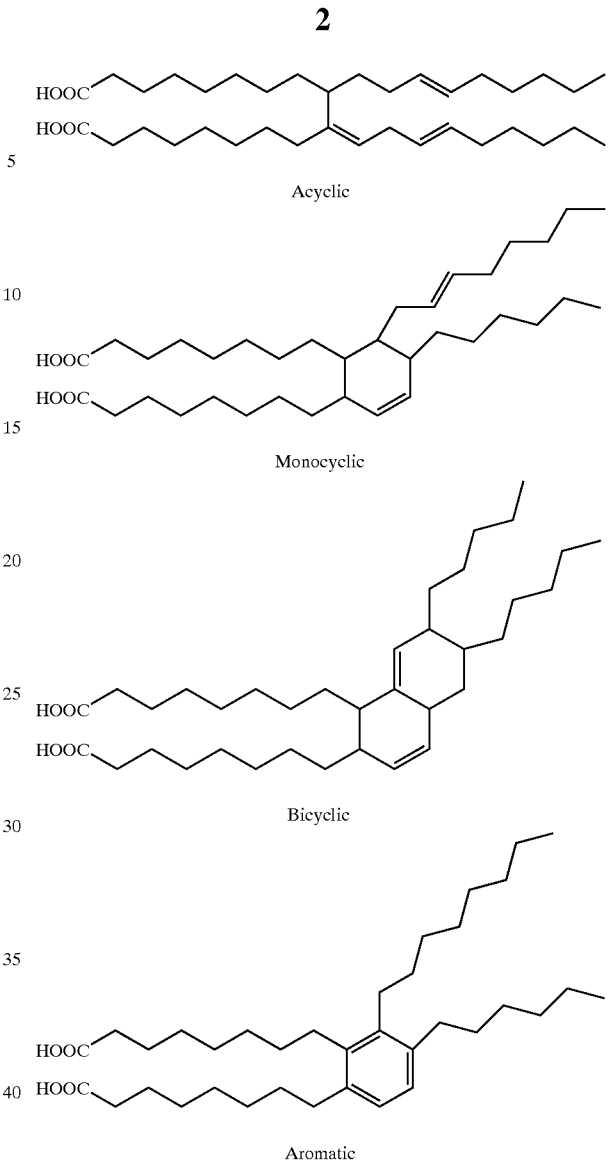

Acyclic

Monocyclic

Bicyclic

Aromatic

Dimer fatty acid is available from Arizona Chemical Company, Dover, Ohio under the trademark "UNIDYME 35." UNIDYME 35 dimer fatty acid contains a low amount of polymeric (trimer and higher) acid. In another embodiment, the dimer fatty acid is UNIDYME 60 dimer fatty acid, which is also available from Arizona Chemical Company, Dover, Ohio. UNIDYME 60 dimer fatty acid contains a relatively higher amount of polymeric acid when compared to UNIDYME 35 dimer fatty acid. In another embodiment, the dimer fatty acid is UNIDYME 14 dimer fatty acid, UNIDYME 22 dimer fatty acid, or UNIDYME 35 dimer fatty acid, all available from Arizona Chemical Company, Dover, Ohio.

Diethanolamine is available from Aldrich Chemical Company, Milwaukee, Wis.

In one embodiment, a condensation product is formed by reacting two molar equivalents of diethanolamine and one molar equivalent of dimer fatty acid. This ratio is used to provide one molar equivalent of diethanolamine for every one molar equivalent of carboxylic acid functionality of the dimer fatty acid.

The condensation product is formed by combining the dimer fatty acid and diethanolamine and heating the mixture at 320–350° F. for between 30 and 60 minutes, or until the condensation reaction is complete.

The following example is illustrative of the methods and compositions discussed above.

EXAMPLE 1

An oil-based drilling fluid was prepared from PETROFREE SF™ 70/30 base (70% isomerized olefin-30% $CaCl_2$ solution), $CaCl_2$, fresh water, GELTONE II™ viscosifier, DURATONE HT™ filtration control, Lime, LE MUL™ emulsifier (oxidized tall oil), LE SUPERMULL™ emulsifier (tall oil fatty acid-amidoamine), and BAROID™ ground barium sulfate, all available from Baroid Drilling Fluids, Houston, Tex., in the amounts listed in TABLE 1. The batch was mixed with a CAFRAMO™ paddle mixer at 600 rpm. The above-described condensation product was added to the oil-based drilling fluid in the amount listed in TABLE 1 while stirring at 600 rpm.

TABLE 1

| Components | Amount |
| --- | --- |
| PETROFREE SF ™ 70/30 base, bbl (ppb) | 0.585 (176) |
| 225,000 ppm $CaCl_2$, bbl (ppb) | 0.288 (122) |
| GELTONE II ™ viscosifier, ppb | 4 |
| DURATONE HT ™ filtration control, ppb | 4 |
| Lime, ppb | 6 |
| LE MUL ™ emulsifier, ppb | 9 |
| LE SUPERMULL ™ emulsifier, ppb | 3 |
| BAROID ™ ground barium sulfate, ppb | 94.02 |
| Condensation product, ppb | 2 |

In an alternative embodiment, the oil-based drilling fluid further comprises DEEPTREAT™ wetting agent, SUSPENTONE™ viscosifier, and/or VIS-PLUS™ stearic acid, all available from Baroid Drilling Fluids, Houston, Tex.

TABLE 2 shows the properties of the condensation product treated oil-based drilling fluid from TABLE 1.

TABLE 2

| Properties: | Initial Conditions | Aged 16 Hours | Aged 32 Hours |
| --- | --- | --- | --- |
| Mud weight, ppg | 10.0 | 10.0 | 10.0 |
| Aging temp, ° F. | N/A | 120 | 150 |
| Aging conditions | N/A | hot-rolled | hot-rolled |
| Aging period, hr | N/A | 16 | 16 |
| Temperature, ° F. | 72 | 72 | 72 |
| Fann 35A data | | | |
| 600 rpm | 64 | 55 | 52 |
| 300 rpm | 38 | 30 | 29 |
| 200 rpm | 28 | 22 | 21 |
| 100 rpm | 17 | 13 | 12 |
| 6 rpm | 5 | 3 | 3 |
| 3 rpm | 4 | 2 | 2 |
| Plastic Viscosity (PV), cP | 26 | 25 | 23 |
| Yield Point (YP), lb/100 $ft^2$ | 12 | 5 | 6 |
| 10 sec. gel, lb/100 $ft^2$ | 7 | 3 | 3 |
| 10 min gel, lb/100 $ft^2$ | 11 | 7 | 7 |
| Electrical stability@72° F., V | 224 | 175 | 202 |

The Initial Conditions column of TABLE 2 shows that upon initial preparation, before aging takes place, the drilling fluid with condensation product exhibits sufficient rheological properties to prevent the settling of any weighting material, as indicated by the 6 and 3 rpm viscosity readings of 5 and 4 Fann units, respectively. Moreover the YP value of 12 lb/100 $ft^2$ demonstrates further proof of adequate rheological properties. Likewise, electrical stability of 224 volts is in the range generally recognized as acceptable by those skilled in the art.

The Aged 16 Hours column of TABLE 2 shows the fluid properties of the same sample after being hot-rolled at 120° F. for 16 hours. The 6 and 3 rpm viscosity readings decreased to 3 and 2 Fann units, respectively, and the YP decreased to 5 lb/100 $ft^2$. The gel strengths and electrical stability decreased as well. This indicates that the suspension effect of the condensation product substantially decreased from initial conditions.

The Aged 32 Hours column of TABLE 2 shows the fluid properties of the same sample after being hot-rolled at 150° F. for an additional 16 hours. The 6 and 3 rpm viscosity readings were the same as before. The YP and the electrical stability increased, which is due to the thermally tightened emulsion of the fluid, similar to the response of a drilling fluid to down hole conditions.

Thus, TABLE 2 demonstrates that the condensation product is an effective suspending agent having a temporary effect.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims.

What is claimed is:

1. A method of temporarily suspending components in a drilling fluid, comprising:
   combining a suspending agent comprising a condensation product of a dimer fatty acid and diethanolamine with an oil-based drilling fluid having components therein, thereby suspending the components in the oil-based drilling fluid; and
   introducing the combination into a wellbore, wherein the ability of the suspending agent to suspend the components in the oil-based drilling fluid decreases after the combination is introduced into the wellbore.

2. The method of claim 1 wherein the condensation product is formed by reacting two molar equivalents of diethanolamine and one molar equivalent of dimer fatty acid.

3. The method of claim 1 wherein the ability of the suspending agent to suspend the components in the oil-based drilling fluid decreases with an increase in temperature.

4. The method of claim 1 wherein the ability of the suspending agent to suspend the components in the oil-based drilling fluid decreases with an increase in shear rates.

5. The method of claim 1 wherein the condensation product is formed by combining the dimer fatty acid and diethanolamine and heating the mixture at 320–350° F. for between 30 and 60 minutes.

6. The method of claim 1 wherein the dimer fatty acid contains a polymeric acid.

7. The method of claim 6 wherein the polymeric acid concentration is greater than the dimer fatty acid concentration.

8. A composition comprising:
   an oil-based drilling fluid having components therein; and
   a suspension agent comprising a condensation product of a dimer fatty acid and diethanolamine, which dimer fatty acid contains a concentration of polymeric acid that is greater than the dimer fatty acid concentration, and which suspension agent suspends the components in the oil-based drilling fluid.

9. The composition of claim 8 wherein the condensation product is formed by reacting two molar equivalents of diethanolamine with one molar equivalent of dimer fatty acid.

10. The composition of claim 8 wherein the ability of the suspending agent to suspend the components in the oil-based drilling fluid is decreased with increased temperature.

11. The composition of claim 8 wherein the ability of the suspending agent to suspend the components in the oil-based drilling fluid is decreased with increased shear rates.

12. The composition of claim 8 wherein the condensation product is formed by combining the dimer fatty acid and diethanolamine and heating the mixture at 320–350° F. for between 30 and 60 minutes.

13. A method of temporarily suspending components in a drilling fluid, comprising:

combining a suspending agent comprising a condensation product of a dimer fatty acid and diethanolamine with an oil-based drilling fluid having components therein; and increasing the shear rate to which the combination is exposed, which increase in shear rate decreases the ability of the suspending agent to suspend the components in the oil-based drilling fluid.

14. The method of claim 13 wherein the condensation product is formed by reacting two molar equivalents of diethanolamine and one molar equivalent of dimer fatty acid.

15. The method of claim 13 wherein the condensation product is formed by combining the dimer fatty acid and diethanolamine and heating the mixture at 320–350° F. for between 30 and 60 minutes.

16. The method of claim 13 wherein the dimer fatty acid contains a polymeric acid.

17. The method of claim 16 wherein the polymeric acid concentration is greater than the dimer fatty acid concentration.

18. A method of temporarily suspending components in a drilling fluid, comprising:

combining a suspending agent comprising a condensation product of a dimer fatty acid and diethanolamine with an oil-based drilling fluid having components therein, thereby suspending the components in the oil-based drilling fluid; and increasing the temperature to which the combination is exposed, which increase in temperature decreases the ability of the suspending agent to suspend the components in the oil-based drilling fluid.

19. The method of claim 18 wherein the condensation product is formed by reacting two molar equivalents of diethanolamine and one molar equivalent of dimer fatty acid.

20. The method of claim 18 wherein the effect of the condensation product in the drilling fluid is decreased with increased shear rates.

21. The method of claim 18 wherein the condensation product is formed by combining the dimer fatty acid and diethanolamine and heating the mixture at 320–350° F. for between 30 and 60 minutes.

22. The method of claim 18 wherein the dimer fatty acid contains a polymeric acid.

23. The method of claim 22 wherein the polymeric acid concentration is greater than the dimer fatty acid concentration.

* * * * *